(12) United States Patent
Kweon

(10) Patent No.: US 8,612,634 B2
(45) Date of Patent: Dec. 17, 2013

(54) TERMINAL APPARATUS AND METHOD FOR CONTROLLING USB APPARATUS THEREOF

(75) Inventor: Tae-deok Kweon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 49 days.

(21) Appl. No.: 12/903,257

(22) Filed: Oct. 13, 2010

(65) Prior Publication Data

US 2011/0131344 A1  Jun. 2, 2011

(30) Foreign Application Priority Data

Nov. 27, 2009 (KR) .................. 10-2009-0115856

(51) Int. Cl.
  *G06F 3/00* (2006.01)
(52) U.S. Cl.
  USPC .............................................................. 710/5
(58) Field of Classification Search
  USPC .............................................................. 710/5
  See application file for complete search history.

(56) References Cited

U.S. PATENT DOCUMENTS

| 6,633,929 | B1 | 10/2003 | Hyder et al. |
| 7,334,072 | B1 * | 2/2008 | Wright ........................... 710/315 |
| 7,685,339 | B2 * | 3/2010 | Tsai et al. ........................ 710/62 |
| 7,752,471 | B1 * | 7/2010 | Kolokowsky ................. 713/310 |
| 2004/0090984 | A1 | 5/2004 | Saint-Hilaire et al. |
| 2005/0209842 | A1 | 9/2005 | Klein |
| 2005/0210176 | A1 | 9/2005 | Zarns |
| 2010/0321151 | A1 * | 12/2010 | Matsuura et al. ............ 340/5.52 |

FOREIGN PATENT DOCUMENTS

| JP | 2007-219711 A | 8/2007 |
| WO | 00-57587 A1 | 9/2000 |

OTHER PUBLICATIONS

Extended European Search Report issued Feb. 23, 2011, in corresponding Application No. 10189304.8.

* cited by examiner

*Primary Examiner* — Chun-Kuan Lee
(74) *Attorney, Agent, or Firm* — Sughrue Mion, PLLC

(57) ABSTRACT

A terminal apparatus connected to an external apparatus controls a universal serial bus (USB) apparatus that is connected to the external apparatus through the external apparatus. The terminal apparatus is connected to the external apparatus through a communication interface including a data channel. The terminal apparatus requests the external apparatus to use the USB apparatus through the data channel. If the USB apparatus is connected to the external apparatus, a controller executes a driver program corresponding to the USB apparatus and accesses the USB apparatus through the data channel. Accordingly, the USB apparatus, which is connected to the external apparatus, is controlled by the terminal apparatus.

15 Claims, 6 Drawing Sheets

TERMINAL APPARATUS AND METHOD FOR CONTROLLING USB APPARATUS THEREOF

CROSS-REFERENCE TO RELATED APPLICATION

This application claims priority from Korean Patent Application No. 10-2009-0115856, filed on Nov. 27, 2009, in the Korean Intellectual Property Office, the disclosure of which is incorporated herein by reference in its entirety.

BACKGROUND

1. Field

Apparatuses and methods consistent with the exemplary embodiments relate to a terminal apparatus and a method for controlling a universal serial bus (USB) apparatus thereof, and more particularly, to a terminal apparatus which is capable of using a USB apparatus connected to an external apparatus, and a method for controlling the USB apparatus thereof.

2. Description of the Related Art

Thanks to the development of electronic technologies, diverse types of electronic apparatuses have been developed and are being widely used in recent years. In particular, even a single independent environment, such as home or office, may be equipped with a plurality of electronic apparatuses. Therefore, there has been an attempt to form a networked environment by connecting the electronic apparatuses to one another and then utilize the connected apparatuses in various ways.

A universal serial bus (USB) interface, which is a communication interface, is easy to use and is supported by most electronic apparatuses. Also, diverse mobile apparatuses, such as digital cameras and mobile phones, may be connected to an external apparatus through the USB interface. Accordingly, users may enjoy data stored in the digital camera or mobile phone through a large display screen provided on a television (TV) or may edit the data using various editing programs after connecting the digital camera or mobile phone to a personal computer (PC). Therefore, the USB interface is widely used in many fields with high efficiency.

However, there is a problem that a USB apparatus connected through the USB interface is accessed only by a host connected thereto. Accordingly, even under a network environment where a lot of terminal apparatuses are connected to one another, in order to provide data stored in the USB apparatus to another user, a user should hand the USB apparatus to the another user directly or store data of the USB apparatus in a separate system such as a server. If the terminal apparatus is not equipped with a USB port, the USB apparatus is not able to be connected to the terminal apparatus and thus cannot be utilized.

SUMMARY

Exemplary embodiments overcome the above disadvantages and other disadvantages not described above. However, it is understood that an exemplary embodiment is not required to overcome the disadvantages described above, and an exemplary embodiment may not overcome any of the problems described above.

Exemplary embodiments provide a terminal apparatus, which is capable of using a universal serial bus (USB) apparatus connected to an external apparatus, and a method for controlling the USB apparatus thereof.

According to an exemplary embodiment, there is provided a terminal apparatus including: an interface unit connected to an external apparatus through a communication interface including a data channel, a communication unit that transmits a query to request use of a universal serial bus (USB) apparatus, in response to receiving a connecting status message that indicates the external apparatus is connected to the USB apparatus through the interface unit, a storage unit that stores USB apparatus information transmitted from the external apparatus in response to the query, and a controller that executes a driver program corresponding to the stored USB apparatus information and accesses the USB apparatus through the data channel.

The interface unit may transmit and receive a data signal that includes a USB packet of a format conforming to a USB standard through the data channel.

According to another exemplary embodiment, there is provided a terminal apparatus including: a USB interface unit connected to a USB apparatus, an interface unit connected to an external apparatus through a communication interface including a data channel, the interface unit notifying the external apparatus of a connecting status of the USB apparatus in response to the USB apparatus being connected to the USB interface unit, a communication unit that transmits USB apparatus information to the external apparatus, in response to receiving a query to request use of the USB apparatus from the external apparatus through the data channel, and a controller that controls the interface unit to allow the external apparatus to access the USB apparatus, in response to the external apparatus executing a driver corresponding to the USB apparatus.

According to another exemplary embodiment, there is provided a method for controlling a USB apparatus of a terminal apparatus connected to an external apparatus through a communication interface including a data channel, the method including: receiving a connecting status message that indicates the USB apparatus is connected to the external apparatus, from the external apparatus to which the USB apparatus is connected, transmitting a query that requests use of the USB apparatus, to the external apparatus, receiving information relating to the USB apparatus from the external apparatus, executing a driver program that controls the USB apparatus using the received information, and accessing the USB apparatus and controlling the USB apparatus through the data channel.

The controlling the USB apparatus may include transmitting and receiving a data signal that includes a USB packet of a format conforming to a USB standard, through the data channel.

According to another exemplary embodiment, there is provided a method for driving a terminal apparatus which is connected to a USB apparatus, the method including: notifying an external apparatus connected through a communication interface, including a data channel, that the USB apparatus is connected to the terminal apparatus, in response to the USB apparatus being connected to the terminal apparatus, receiving a query that requests use of the USB apparatus from the external apparatus through the data channel, transmitting USB apparatus information to the external apparatus, and transmitting a data signal including a USB packet of a format conforming to a USB standard between the external apparatus and the USB apparatus.

Additional aspects and advantages of the present inventive concept will be set forth in the detailed description, and will be obvious from the detailed description, or may be learned by practicing the invention.

BRIEF DESCRIPTION OF THE DRAWING FIGURES

The above and/or other aspects will be more apparent by describing in detail exemplary embodiments, with reference to the accompanying drawings in which.

DETAILED DESCRIPTION OF THE EXEMPLARY EMBODIMENTS

Figure 1:
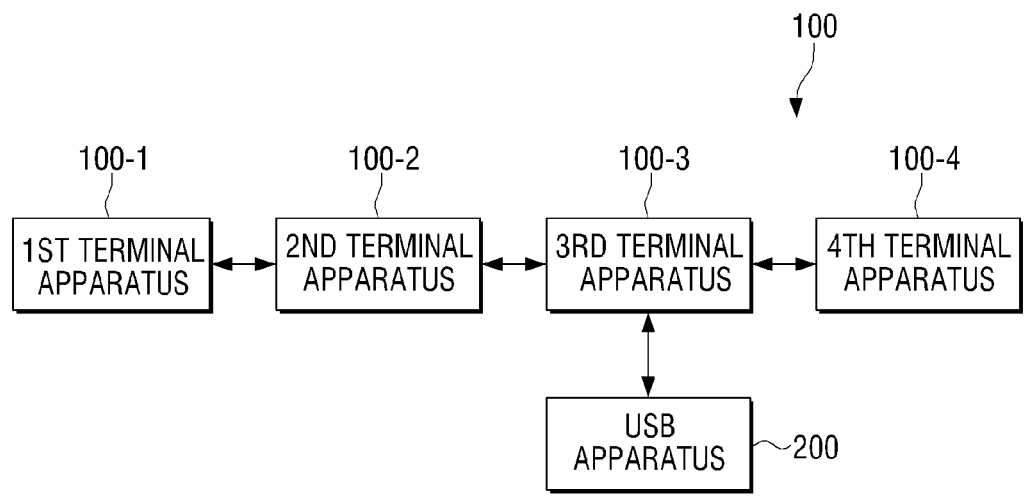
FIG. 1 is a block diagram illustrating a system according to an exemplary embodiment.

Hereinafter, exemplary embodiments will be described in greater detail with reference to the accompanying drawings.

In the following description, same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the invention with unnecessary detail.

FIG. 1 is a block diagram illustrating a system according to an exemplary embodiment. The system 100 of FIG. 1 includes a plurality of terminal apparatuses 100-1, 100-2, ..., 100-4 and a universal serial bus (USB) apparatus 200 connected to the third terminal apparatus 100-3 of the plurality of terminal apparatuses. The system 100 of FIG. 1 is merely an example, and the number of terminal apparatuses and the number of USB apparatuses are variable.

In FIG. 1, the terminal apparatuses 100-1, 100-2, ..., 100-4 may be connected to one another in the form of a daisy chain. More specifically, the terminal apparatuses 100-1, 100-2, ..., 100-4 are connected to one another through a single communication interface including a video channel, an audio channel, and a data channel. For example, the terminal apparatuses 100-1, 100-2, ..., 100-4 may be connected to one another through an "S-link" communication interface.

The S-link interface is an extended version of a high-definition multimedia interface (HDMI) interface. The HDMI interface is a standard that allows video/audio signals to be transmitted, along with a control signal, while maintaining compatibility with a digital visual interface (DVI). The S-link interface is thus similar to the HDMI interface.

The terminal apparatuses 100-1, 100-2, ..., 100-4 may be implemented as diverse types of electronic apparatuses, such as a television, a personal computer, a monitor, an electronic album, a laptop computer, an audio player, a digital versatile disk (DVD) player, a blue-ray disk player, a video cassette recorder (VCR), an MP3 player, a set-top box, and the like. Of these terminal apparatuses, the third terminal apparatus 100-3 is connected to an external apparatus, such as the USB apparatus 200.

The USB apparatus 200 may be any apparatus that can be connected through a USB interface. The USB interface, which is a type of serial interface, is a plug-and-play interface that can solve the problems of a general external expansion port (serial or parallel port), such as low speed and limited number of apparatuses to be connected. The USB interface may connect a computer to peripheral devices, such as an audio player, a joystick, a keyboard, a telephone, a scanner, a printer, and the like. For example, the USB apparatus 200 may be plural apparatuses, such as a digital camera, a mobile phone, a USB memory, an electronic book, and a net book.

If the USB apparatus 200 is connected to the third terminal apparatus 100-3 through a USB port provided on the third terminal apparatus 100-3, a driver program of the third terminal apparatus 100-3 is activated. Using the driver, the third terminal apparatus 100-3 initializes the USB apparatus 200 according to a communication class interface. During the initialization process, the USB apparatus 200 and the third terminal apparatus 100-3 exchange information, such as a class of the USB apparatus 200, a size of a USB packet, and a bandwidth of a USB packet, with each other. If the initialization process is completed, the third terminal apparatus 100-3 and the USB apparatus 200 are able to exchange data with each other through the USB interface.

In the state where the USB apparatus 200 is connected to only the third terminal apparatus 100-3, as shown in FIG. 1, another terminal apparatus, for example, the second terminal apparatus 100-2 may wish to access the USB apparatus 200.

In such a case, the third terminal apparatus 100-3 notifies the other terminal apparatuses 100-1, 100-2, 100-4 that the USB apparatus 200 has been connected thereto, when the initialization process is in progress or is completed. The third terminal apparatus 100-3 may notify all of the surrounding apparatuses connected thereto of the connection with the USB apparatus 200 in a broadcasting method. a multicast method, or a unicast method, using information of the surrounding apparatuses.

Upon receiving a notification of the connection with the USB apparatus 200, each terminal apparatus 100-1, 100-2, 100-4 displays a corresponding alarming message to notify a user that the USB apparatus is available for use and inquire of a user whether to use the USB apparatus 200. The alarming message may be displayed on each terminal apparatus 100-1, 100-2, 100-4 in the form of an on screen display (OSD) or may be displayed through a user interface (UI) window.

Accordingly, if the user of the second terminal apparatus 100-2 inputs a selection signal to use the USB apparatus 200, the second terminal apparatus 100-2 transmits a query, to request use of the USB apparatus 200, to the third terminal apparatus 100-3. In response to the query, the third terminal apparatus 100-3 transmits USB apparatus information regarding the USB apparatus 200. The USB apparatus information may include the class of the USB apparatus 200, the size of a USB packet, and the bandwidth of a USB packet. Based on the USB apparatus information, the second terminal apparatus 100-2 executes a driver program to access the USB apparatus 200. Accordingly, a central processing unit (CPU) and a main memory of the second terminal apparatus 100-2, for executing the driver program, may operate as a host controller to access the USB apparatus 200.

That is, the second terminal apparatus 100-2 generates a data signal, including a USB packet of a format conforming to the USB standard, and transmits the data signal to the third terminal apparatus 100-3 through a data channel formed between the second terminal apparatus 100-2 and the third terminal apparatus 100-3. The third terminal apparatus 100-3 transmits a USB packet, included in the data signal received through the data channel, to the USB apparatus 200. The third terminal apparatus 100-3 also transmits, to the second terminal apparatus 100-2, a USB packet output from the USB apparatus 200 by including the USB packet in the data signal without changing the format of the USB packet. In this operation, the execution of the driver program of the third terminal apparatus 100-3 terminates and the driver program of the second terminal apparatus 100-2 operates as a host controller for the USB apparatus 200.

The data signal including the USB packet may include address information of the second terminal apparatus 100-2 and address information of the third terminal apparatus 100-3. Also, the data signal may include a starting point of the USB packet within the data and size information.

On the other hand, the other terminal apparatuses 100-1, 100-3 may operate as a host for the USB apparatus 200. If the first terminal apparatus 100-1 wishes to use the USB apparatus 200, the second terminal apparatus 100-2, located between the first terminal apparatus 100-1 and the third terminal apparatus 100-3, serves as a relay to relay the data signal between the first terminal apparatus 100-1 and the third terminal apparatus 100-3.

According to another exemplary embodiment, a terminal apparatus, which wishes to use a USB apparatus, may transmit a query to search for a terminal apparatus to which the USB apparatus has been connected in advance. That is, the third terminal apparatus 100-3 may not notify the surrounding apparatuses that the USB apparatus 200 has been connected. In this case, if the user of the first terminal apparatus 100-1 inputs a selection signal to search for a terminal to which the USB apparatus has been connected, the first terminal apparatus 100-1 may transmit a query to the surrounding apparatuses using the broadcasting, multicasting, or unicast method. If the second terminal apparatus 100-2 or the fourth terminal apparatus 100-4, to which the USB apparatus 200 is not connected, receives the query, the second terminal apparatus 100-2 and the fourth terminal apparatus 100-4 discard the query.

On the other hand, if the third terminal apparatus 100-3, to which the USB apparatus 200 has been connected, receives the query, the third terminal apparatus 100-3 may transmit the USB apparatus information to the first terminal apparatus 100-1 in response to the query. Accordingly, the first terminal apparatus 100-1 may operate as a USB host.

On the other hand, if all of the plurality of terminal apparatuses transmits a query to use the USB apparatus 200, the third terminal apparatus 100-3 may transmit the USB apparatus information in response to only a firstly received query and give a USB host right to a corresponding terminal apparatus. In this case, if the first terminal apparatus 100-1 operating as a USB host finishes using the USB apparatus 200, the USB host right may be given to the next terminal apparatus. Accordingly, the third terminal apparatus 100-3 may give a priority to the terminal apparatuses which have transmitted the query in order of transmitted query, and store the priority information.

Figure 2:
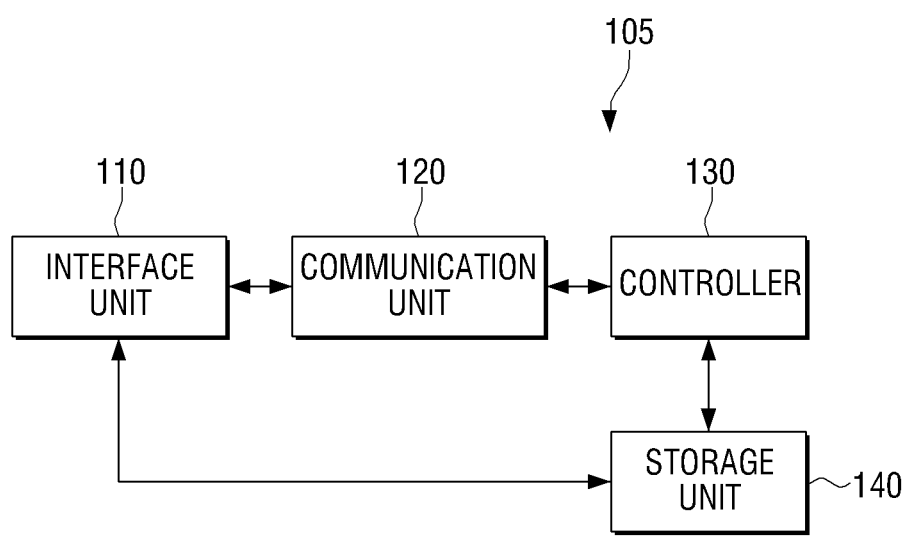
FIG. 2 is a block diagram illustrating a terminal apparatus according to an exemplary embodiment.

FIG. 2 is a block diagram illustrating a terminal apparatus according to an exemplary embodiment. Referring to FIG. 2, the terminal apparatus 105 includes an interface unit 110, a communication unit 120, a controller 130, and a storage unit 140. The terminal apparatus 105 shown in FIG. 2 is not connected with the USB apparatus 200, and thus the USB interface is omitted. However, the USB interface may be added to the apparatus 105. The controller 130 may be a central processing unit (CPU), and the storage unit 140 may be a memory, such as a read-only memory (ROM), random access memory (ROM), flash memory, or the like.

The interface unit 110 is connected to an external apparatus through a communication interface including a data channel. The communication interface may use an S-link interface, as described above.

The communication unit 120 communicates with the external apparatus connected through the interface 110. More specifically, if the connecting status of the external apparatus with the USB apparatus 200 is notified through the interface 110, the communication unit 120 may transmit a query to request use of the USB apparatus 200 to the external apparatus.

Prior to transmitting the query, the terminal apparatus 105 may inquire of the user whether to use the USB apparatus 200. More specifically, the terminal apparatus 105 may further include a user interface unit (not shown) through which a message inquiring of the user whether to use the USB apparatus 200 is output, and a selection signal representing the user's intention to use the USB apparatus 200 is input by the user in response to the message. The user interface unit may include a display panel or a speaker to output the message.

If USB apparatus information is transmitted from the external apparatus in response to the query transmitted through the communication unit 120, the storage unit 140 stores the received USB apparatus information.

The controller 130 executes a driver program corresponding to the USB apparatus information stored in the storage unit 140. Consequently, the terminal apparatus 105 serves as a host controller for the USB apparatus 200. More specifically, the controller 130 directly accesses the USB apparatus 200 and receives a list of data files stored in the storage unit 140 of the USB apparatus 200 and displays the list on a screen. If the user selects a specific file from the displayed list, the terminal apparatus receives data relating to the selected file from the USB apparatus 200. Accordingly, the terminal apparatus 105 executes a predetermined application corresponding to the received data to process the received data. For example, if the data is a photo file, the terminal apparatus 105 executes an image conversion program to convert the data into a photo of a resolution corresponding to a display panel (not shown) provided on the terminal apparatus 105, and displays the photo on the screen.

Figure 3:
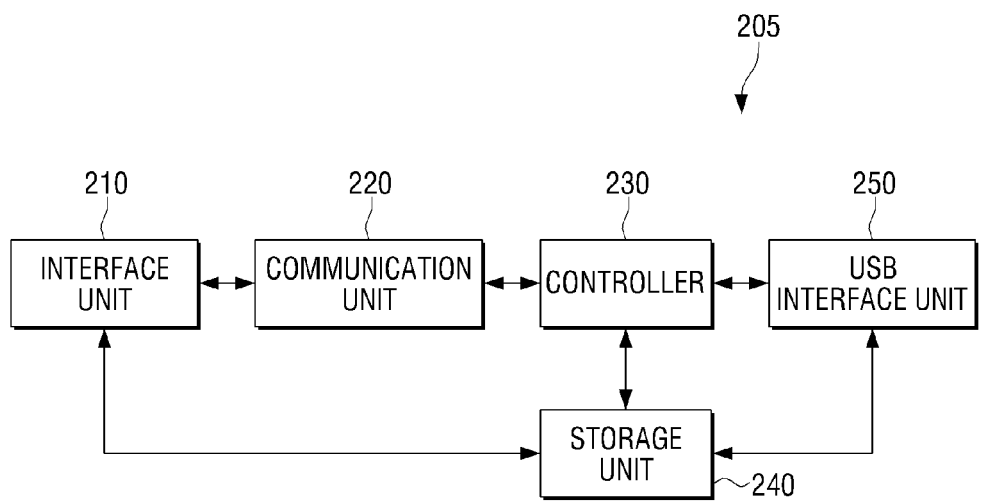
FIG. 3 is a block diagram illustrating a terminal apparatus according to an exemplary embodiment.

FIG. 3 is a block diagram illustrating a terminal apparatus that is connected with the USB apparatus 200 according to an exemplary embodiment. Referring to FIG. 3, the terminal apparatus 205 includes an interface unit 210, a communication unit 220, a controller 230, a storage unit 240, and a USB interface unit 250.

The interface unit 210 is connected to surrounding apparatuses through a communication interface including a data channel.

The communication unit 220 exchanges various signals with the surrounding apparatuses through the communication interface connected to the interface unit 210.

The controller 230 controls overall operation of the terminal apparatus 205, and the storage unit 240 stores various programs and sources necessary for driving the terminal apparatus 205 and various data transmitted from an external apparatus. The controller 230 may be a central processing unit (CPU), and the storage unit 240 may be a memory, such as a read-only memory (ROM), random access memory (ROM), flash memory, or the like.

The USB interface unit 250 is connected to the USB apparatus 200. The USB interface unit 250 includes a USB port to which a USB connector is directly connected. Accordingly, if the USB connector is connected, the USB interface unit 250 recognizes the connecting status of the USB apparatus 200 and notifies the controller 230 of the connecting status.

If the controller 230 is notified of the connecting status of the USB apparatus 200, the controller 230 executes a driver program corresponding to the USB apparatus 200 and initializes the connecting status of the USB apparatus 200, and then identifies data stored in the USB apparatus 200.

In this operation, the controller 230 controls the communication unit 220 to generate a signal to notify the surrounding apparatuses connected through the interface unit 210 of the connecting status of the USB apparatus 200. The communication unit 220 transmits the generated signal to the surrounding apparatuses through the interface unit 210, thereby informing the surrounding apparatuses that the USB apparatus 200 has been connected.

If a query to request use of the USB apparatus 200 is received from at least one external apparatus, the controller 240 controls the communication unit 220 to transmit USB apparatus information to the external apparatus that has transmitted the query.

If the external apparatus executes a driver program corresponding to the USB apparatus to operate as a USB host controller, the controller 230 transmits a USB packet within a data signal transmitted from the external apparatus to the USB apparatus 200 so that the external apparatus accesses the USB apparatus 200, and transmits a USB packet transmitted from the USB apparatus 200 to the external apparatus by including the USB packet in the data signal.

Prior to informing the surrounding apparatus that the USB apparatus 200 has been connected, the controller 230 may perform a process of inquiring of the user whether to notify of the connecting status of the USB apparatus 200. That is, if the controller 230 is notified that the USB apparatus 200 has been connected through the USB interface unit 250, the controller 230 may output an inquiry message to inquire of a user whether to allow the surrounding apparatuses to use the USB apparatus 200 through an output element such as a display panel or a speaker (not shown). If the user allows the surrounding apparatuses to use the USB apparatus 200, the fact that the USB apparatus 200 has been connected may be notified to the surrounding apparatuses. On the other hand, if a selection signal for disallowing the use of the USB apparatus 200 is input, or if no response is input for a predetermined time after the message is output, the fact that the USB apparatus 200 has been connected may not be notified.

Also, the controller 230 may inquire of the user whether to allow the surrounding apparatuses to use the USB apparatus 200, after the query is transmitted from the surrounding apparatuses. The method of inquiring may be realized as described above.

Also, if the query is transmitted from a plurality of surrounding apparatuses, the controller 230 may notify the user of information relating to the surrounding apparatuses that have transmitted the query, and may allow only the surrounding apparatus selected by the user to use the USB apparatus 200. The information relating to the surrounding apparatuses may use information included in the query or information pre-stored in a memory, or may be requested and received from the surrounding apparatuses.

Figure 4:
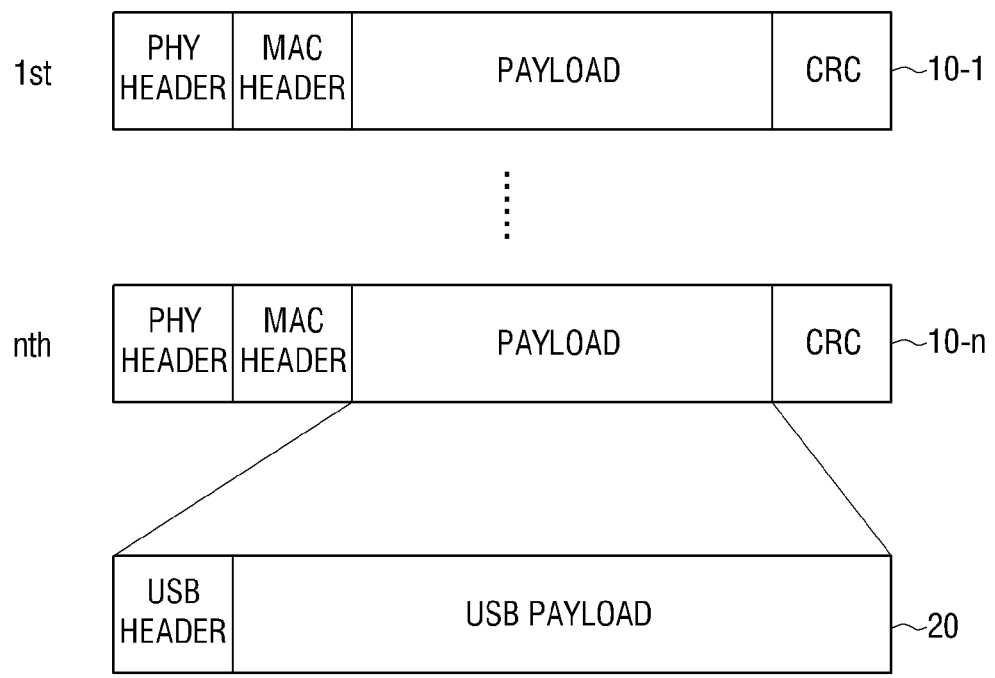
FIG. 4 is a view illustrating a structure of a data signal transmitted between terminal apparatuses.

FIG. 4 is a view illustrating a structure of a data signal transmitted among terminal apparatuses. Referring to FIG. 4, the data signal may include a predetermined number of packets 10-1 to 10-n. The size, structure, unit, and number of packets may be differently determined according to a communication interface standard used among the terminal apparatuses.

At least one packet of the data signal may include a USB packet 20 conforming to a USB format. As shown in FIG. 4, the USB packet includes a USB header and a USB payload area. If the third terminal apparatus 100-3 connected with the USB apparatus 200 receives the data signal of the format shown in FIG. 4 from another terminal apparatus, the third terminal apparatus 100-3 identifies the location and size of the USB packet with reference to the USB header, divides the USB packet according to the identified information, and transmits the USB packet to the USB apparatus 200. Conversely, a USB packet transmitted from the USB apparatus 200 is included in the data signal of the format shown in FIG. 4 and is transmitted to another terminal apparatus that operates as a USB host.

The structure of the data signal of FIG. 4 is merely an example and is variable.

Figure 5:
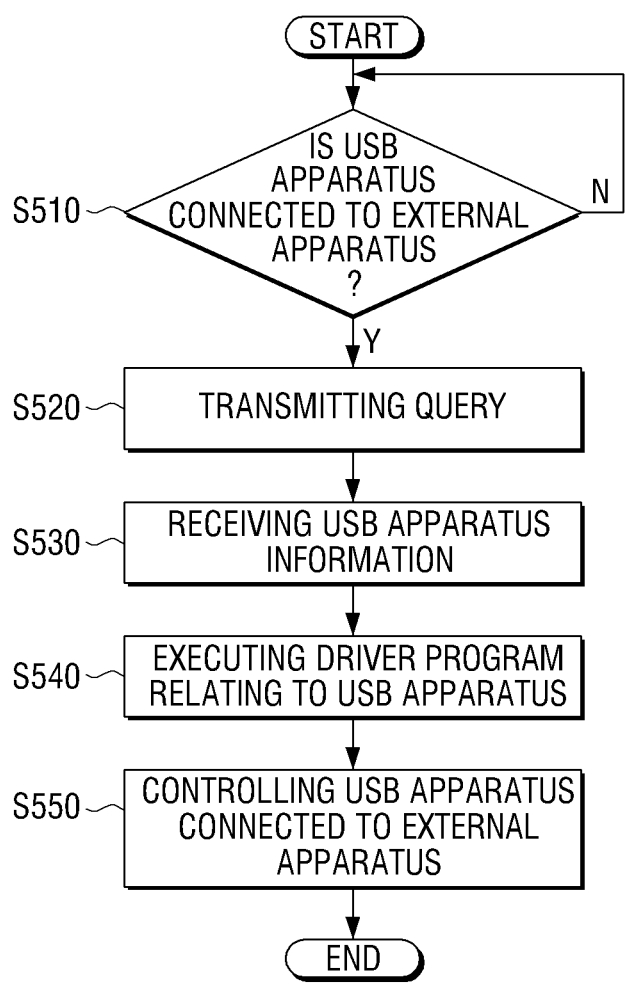
FIG. 5 is a flowchart illustrating a method for controlling a universal serial bus (USB) apparatus of a terminal apparatus according to an exemplary embodiment.

FIG. 5 is a flowchart illustrating a method for using a USB apparatus by a terminal apparatus according to an exemplary embodiment.

Referring to FIG. 5, if an external apparatus is identified as being connected with the USB apparatus 200 (S510), a query is transmitted (S520). A terminal apparatus may be notified of whether the USB apparatus 200 has been connected to the external apparatus by the external apparatus. However, the terminal apparatus may directly identify whether the USB apparatus 200 has been connected by periodically monitoring the status of the external apparatus.

If USB apparatus information is received from the external apparatus in response to the query (S530), the terminal apparatus executes a driver program relating to the USB apparatus 200 based on the received USB apparatus information (S540).

Accordingly, the terminal apparatus serves as a host controller for the USB apparatus 200 and also directly accesses the USB apparatus 200 connected to the external apparatus to control the USB apparatus 200 (S550).

Figure 6:
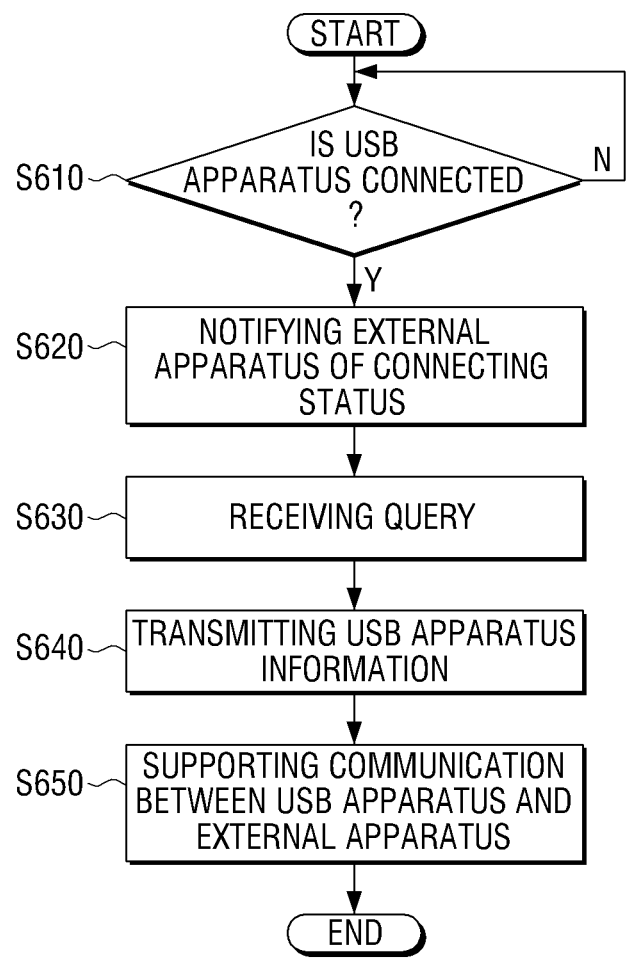
FIG. 6 is a flowchart illustrating a method for driving the terminal apparatus connected to the USB apparatus.

FIG. 6 is a flowchart illustrating an operation of a terminal apparatus to which the USB apparatus 200 has been connected.

Referring to FIG. 6, if the USB apparatus 200 is connected (S610), the connecting status of the USB apparatus 200 is notified to an external apparatus (S620). If a query is received from the external apparatus (S630), USB apparatus information is transmitted in response to the query (S640). In this operation, an operation of inquiring of a user and obtaining user's approval may be added as described above.

Accordingly, if a driver program corresponding to the USB apparatus information is executed in the external apparatus, the terminal apparatus supports communication between the USB apparatus 200 and the external apparatus (S650). More specifically, the terminal apparatus separates a USB packet from a data signal transmitted from the external apparatus and transmits the USB packet to the USB apparatus 200, and includes a USB packet transmitted from the USB apparatus 200 in the data signal and transmits the data signal to the external apparatus. Accordingly, the effect of connecting the USB apparatus 200, which has no external communicating function, to the external apparatus is achieved.

As described above, the USB apparatus 200 connected to the external apparatus may be easily utilized.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A terminal apparatus comprising:
   an interface unit directly connected to an external apparatus through a communication interface including a data channel, the external apparatus operating as a first host controller that accesses a universal serial bus (USB) apparatus directly connected to the external apparatus by executing a first driver program that operates according to a communication class interface of the USB apparatus;
   a communication unit that transmits data to the external apparatus through the interface unit;
   a storage unit that stores USB apparatus information received from the external apparatus to access the USB apparatus; and
   a controller that controls the communication unit to transmit to the external apparatus a request to access the USB apparatus that terminates the first driver program, executes a second driver program that operates according to the communication class interface of the USB apparatus corresponding to the stored USB apparatus information to operate the terminal apparatus as a second host controller to access the USB apparatus, and accesses the USB apparatus as the second host controller through the data channel via the external apparatus.

2. The terminal apparatus as claimed in claim 1, wherein the interface unit transmits and receives a data signal that includes a USB packet of a format conforming to a USB standard through the data channel.

3. The terminal apparatus according to claim 1, wherein the interface unit comprises a wired interface comprises one of an S-link interface and an high-definition multimedia interface (HDMI) interface.

4. A terminal apparatus comprising:
   a universal serial bus (USB) interface unit directly connected to a USB apparatus;
   an interface unit directly connected to an external apparatus through a communication interface including a data channel, the interface unit notifying the external apparatus of a connecting status of the USB apparatus in response to the USB apparatus being connected to the USB interface unit;
   a communication unit that transmits USB apparatus information to the external apparatus, in response to receiving a request for use of the USB apparatus from the external apparatus through the data channel; and
   a controller that controls the terminal apparatus to operate as a first host controller that accesses the USB apparatus by executing a first driver program that operates according to a communication class interface of the USB apparatus, terminates the first driver program and controls the interface unit to allow the external apparatus to access the USB apparatus through the terminal apparatus, in response to the external apparatus requesting the terminal apparatus to access the USB apparatus through the terminal apparatus and executing a second driver program that operates according to the communication class interface of the USB apparatus to operate the external apparatus as a second host controller to access the USB apparatus.

5. The terminal apparatus according to claim 4, wherein the interface unit comprises a wired interface comprises one of an S-link interface and an high-definition multimedia interface (HDMI) interface.

6. A method for controlling a universal serial bus (USB) apparatus of a terminal apparatus connected to an external apparatus through a communication interface including a data channel, the method comprising:
   receiving a connecting status message that indicates the USB apparatus is connected to the external apparatus, from the external apparatus, the external apparatus operating as a first host controller that accesses the USB apparatus directly connected to the external apparatus by executing a first driver program that operates according to a communication class interface of the USB apparatus;
   transmitting a request for use of the USB apparatus, to the external apparatus;
   receiving information relating to the USB apparatus, from the external apparatus;
   executing a second driver program that operates according to the communication class interface of the USB apparatus to control the USB apparatus using the received information to operate the terminal apparatus as a second host controller to access the USB apparatus; and
   transmitting to the external apparatus a data signal that terminates the first driver program and accessing the USB apparatus and controlling the USB apparatus as the second host controller through the data channel via the external apparatus.

7. The method as claimed in claim 6, wherein the data signal that includes a USB packet of a format conforming to a USB standard.

8. The method according to claim 6, wherein the communication interface comprises a wired interface comprises one of an S-link interface and an high-definition multimedia interface (HDMI) interface.

9. A method for driving a terminal apparatus, the method comprising:
   operating the terminal apparatus as a first host controller that accesses a universal serial bus (USB) apparatus directly connected to the terminal apparatus by executing a first driver program that operates according to a communication class interface of the USB apparatus;
   notifying an external apparatus directly connected through a communication interface, including a data channel, that the USB apparatus is directly connected to the terminal apparatus, in response to the USB apparatus being connected to the terminal apparatus;
   receiving from the external apparatus through the data channel a request to access the USB apparatus as a second host controller using a second driver program that operates according to the communication class interface of the USB apparatus through the data channel;
   transmitting USB apparatus information to the external apparatus; and
   terminating the first driver program and transmitting a data signal including a USB packet of a format conforming to a USB standard between the external apparatus as the second host controller and the USB apparatus.

10. The method according to claim 9, wherein the communication interface comprises a wired interface comprises one of an S-link interface and an high-definition multimedia interface (HDMI) interface.

11. An accessing apparatus for remotely controlling, through an external apparatus, a universal serial bus (USB) apparatus directly connected to the external apparatus, the apparatus comprising:
   an interface that directly connects the accessing apparatus to the external apparatus over a communication interface that includes a data channel, the external apparatus operating as a first host controller that accesses the USB apparatus by executing a first driver program that operates according to a communication class interface of the USB apparatus; and a processor that executes a second driver program that operates according to the communication class interface of the USB apparatus that causes the accessing apparatus to operate as a second host controller and generate a command that controls the USB apparatus, and transmits the command over the data channel through the interface and the external apparatus to the USB apparatus, the command causing the external apparatus to terminate the first driver program in response to receiving the command, wherein the processor receives a status message, from the external apparatus, that indicates the external apparatus is connected to the USB apparatus, and wherein, in response to receiving the status message, the processor transmits a query that requests the external apparatus for USB operating information of the USB apparatus.

12. The accessing apparatus according to claim 11, wherein the processor receives the USB operating information from the external apparatus, in response to the query, and wherein the controller executes the second driver program and generates the command based on the USB operating information.

13. The accessing apparatus according to claim 12, further comprising a memory that stores the USB operating information.

14. The accessing apparatus according to claim 12, wherein the USB operating information comprises at least one of a class of the USB apparatus, a size of a USB packet used by the USB apparatus, and a bandwidth of the USB packet used by the USB apparatus.

15. The accessing apparatus according to claim 11, wherein the interface comprises a wired interface comprises one of an S-link interface and an high-definition multimedia interface (HDMI) interface.

* * * * *